United States Patent [19]

Brennan

[11] 3,827,149
[45] Aug. 6, 1974

[54] DENTAL HANDPIECE

[75] Inventor: Thomas J. Brennan, Portage, Mich.

[73] Assignee: Stryker Corporation, Kalamazoo, Mich.

[22] Filed: Sept. 15, 1972

[21] Appl. No.: 289,209

[52] U.S. Cl. .................................................. 32/26
[51] Int. Cl. .............................................. A61c 1/08
[58] Field of Search .................................. 32/26, 27

[56] References Cited
UNITED STATES PATENTS
2,432,179  12/1967  Staut ....................................... 32/26
3,496,638   2/1970  Staut ....................................... 32/26

Primary Examiner—Robert Peshock
Attorney, Agent, or Firm—Woodhams, Blanchard and Flynn

[57] ABSTRACT

A handpiece assembly, particularly for a dental tool or the like, having a drive shaft assembly rotatably supported within a housing which is adapted to be manually held. The tool, such as a drill, is releasably connected to the drive shaft assembly by means of a releasable coupling device which is nonrotatably supported on and axially movable relative to the drive shaft assembly, which rotates the drill. The coupling device and tool shank are provided with cooperating surfaces which prohibit relative rotation therebetween. The coupling device can be manually moved axially of the shaft to disengage the tool, whereupon the tool can then be manually rotated to disengage it from the drive shaft so that the tool can then be axially withdrawn from the handpiece assembly. The coupling device includes brake means for resisting rotation of the drive shaft assembly during the insertion or removal of the tool.

13 Claims, 10 Drawing Figures

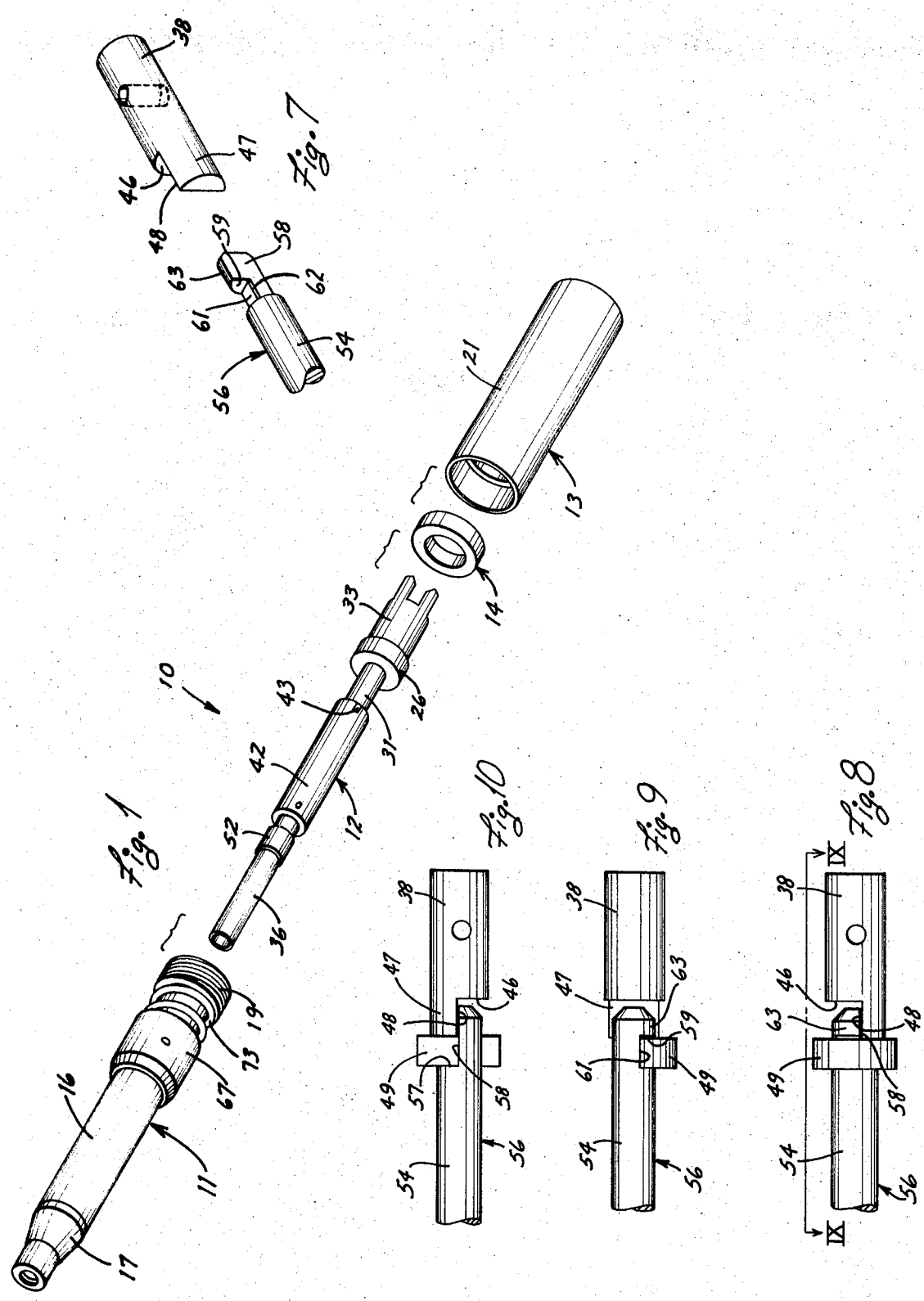

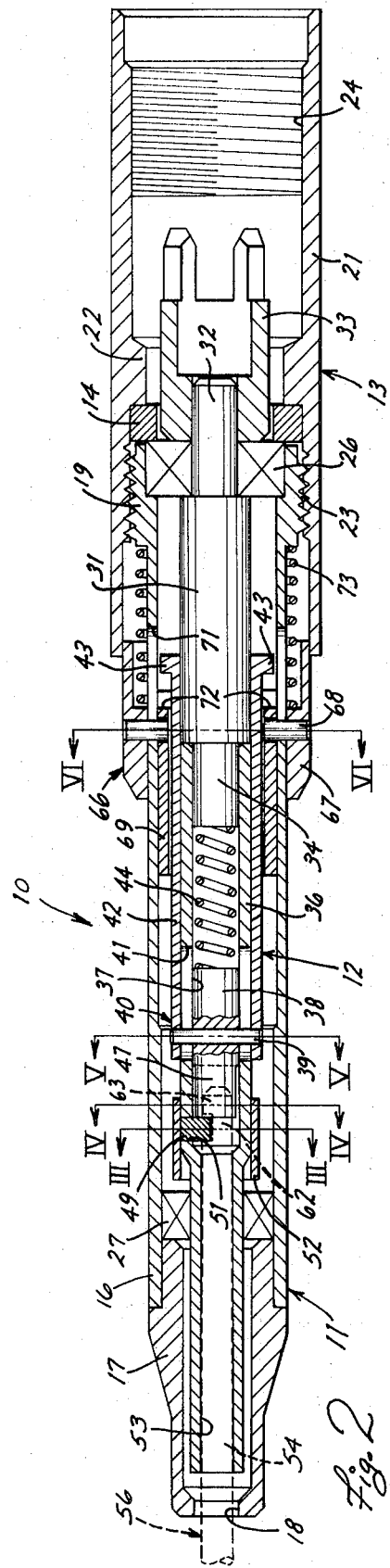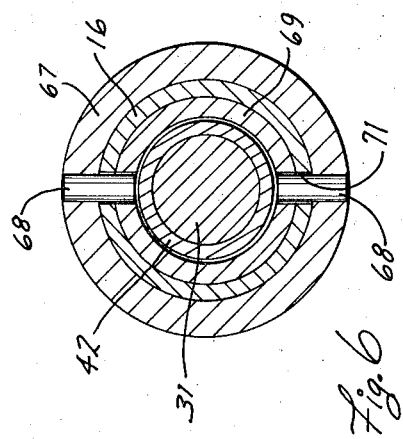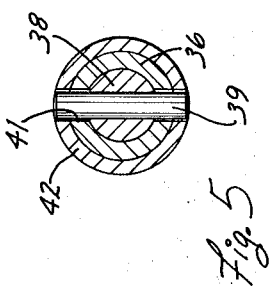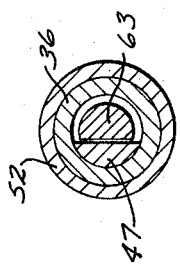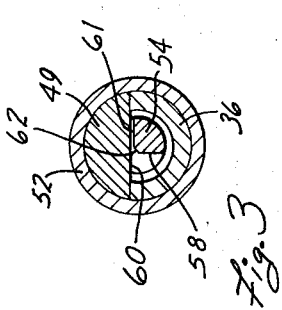

3,827,149

DENTAL HANDPIECE

FIELD OF THE INVENTION

This invention relates to a handpiece assembly for rotatably supporting and driving a tool and, in particular, to an improved handpiece assembly which can be easily and releasably connected to the shank of a tool, such as a dental drill or the like, for rotating said tool.

BACKGROUND OF THE INVENTION

Numerous handpiece assemblies have been devised for rotatably supporting and drivingly engaging the shank of a tool, such as a dental drill or the like. While most of these known handpiece assemblies have operated in a satisfactory manner, nevertheless it has been discovered that many of the known assemblies do not permit the shank of the tool to be inserted into or removed from the handpiece assembly with the ease and efficiency desired, while still resulting in a secure torsional driving relationship between the tool and the drive shaft of the handpiece assembly. Further, in many of the known handpiece assemblies, the actuating structure utilized for permitting the tool to be released from the handpiece assembly is positioned so that same can be accidentally contacted or actuated during utilization of the handpiece assembly, Accordingly, in a continuing effort to improve on handpiece assemblies of this type, the present invention has been devised to greatly simplify both the insertion and removal of the tool with respect to the handpiece assembly, while at the same time resulting in a secure torque transmitting connection between the drive shaft of the handpiece assembly and the tool to permit safe operation of same.

It is also an object of the present invention to provide an improved handpiece assembly, as aforesaid, which provides an actuating means for permitting simple release of the tool, while at the same time the actuating means is positioned so that same can not be accidentally contacted or actuated during normal utilization of the handpiece assembly.

A further object of the present invention is to provide a handpiece assembly, as aforesaid, which includes a releasable coupling structure coacting between the handpiece drive shaft and the shank of the tool, which releasable coupling structure is designed to coact with a conventional tool shank to permit the tool to be easily, efficiently and drivingly connected or disconnected from the drive shaft without requiring the use of externally located detent buttons, levers, or the like.

A further object of the present invention is to provide a handpiece assembly, as aforesaid, which includes coupling structure which prevents both rotational and axial movement of the tool relative to the drive shaft when same are coupled together.

A further object of the present invention is to provide a handpiece assembly, as aforesaid, which can be manufactured from relatively simple and uniform parts to thereby facilitate both the assembly, operation and maintenance of the device.

Another object of the present invention is to provide a handpiece assembly, as aforesaid, which can be easily and safely manipulated within the user's hand without fear of accidentally disconnecting the tool, while at the same time the handpiece assembly incorporates actuating structure which can be easily manually moved to facilitate the simple removal of a tool from the handpiece assembly and the insertion of a different tool.

Other objects and purposes of the present invention will be apparent to persons acquainted with devices of this type upon reading the following specification and inspecting the accommpanying drawings.

BRIEF DESCRIPTION OF THE DRAWINGS

FIG. 1 is an exploded perspective view of the improved handpiece assembly constructed according to the present invention.

FIG. 2 is a central sectional view of the improved handpiece assembly.

FIG. 3 is a sectional view taken along the line III—III in FIG. 2.

FIG. 4 is a sectional view taken along the line IV—IV in FIG. 2.

FIG. 5 is a sectional view taken along the Line V—V in FIG. 2.

FIG. 6 is a sectional view taken along the line VI—VI in FIG. 2.

FIG. 7 is an exploded perspective view illustrating the cooperating adjacent ends of the tool and locking plug.

FIG. 8 illustrates the driving relationship between the adjacent ends of the tool shank and the locking plug, same being illustrated substantially as viewed from the top side of FIG. 2.

FIG. 9 is a side view of the structure illustrated in FIG. 8, same being taken substantially along the line IX—IX in FIG. 8.

FIG. 10 is a bottom view of the structure illustrated in FIG. 8.

Certain terminology will be used in the following description for convenience in reference only and will not be limiting. For example, the terms "upper," "lower," "rightward," and "leftward" will have reference to the device and parts thereof as appearing in the drawings. The terms "front" and "rear" will have reference to the left and right ends, respectively, as appearing in FIG. 2. The terms "inner" and "outer" will have reference to the geometric center of the device and designated parts thereof. Said terminology will include the words above specifically mentioned, derivatives thereof and words of similar import.

SUMMARY OF THE INVENTION

The objects and purposes of the present invention, including those set forth above, have been met by providing a handpiece assembly which includes an elongated tubular housing adapted to have one end thereof connected to a suitable motor structure and adapted to have a rotatable tool extend from the other end thereof. An elongated drive shaft assembly is rotatably supported within and extends axially of the housing and is provided with a coupling part on the rear or input end thereof for releasable connection to a suitable power source. The front or output end of the drive shaft assembly has releasable coupling means mounted thereon and disposed for locking engagement with the shank of a suitable tool. The coupling means, which is nonrotatably connected to but axially slidably supported on the drive shaft assembly, is movable by an actuating means which includes an actuating ring surrounding the housing and slidably supported thereon. The actuating ring, when moved axially of the housing in opposition to the urging of a spring, engages the coupling means to move same axially of the drive shaft assembly to thus drivingly disconnect same from the tool. The actuating means and the coupling means have cooperating brake portions which either frictionally or positively maintain the coupling means and the drive shaft assembly in a nonrotatable condition to enable the tool to be manually rotated relative to the drive shaft, thereby permitting the tool to be axially withdrawn from the handpiece assembly. The drive shaft assembly includes a key having a substantially half moon shape, which key extends into a transverse slot spaced from the rearward end of the tool shank for driving same. The free end of the tool shank is provided with a substantially half moon-shaped segment which extends transversely of the slot and has a substantially diametrically extending flat which coacts with a similar flat formed on a cooperating portion of the coupling means for enabling the tool to be disposed in locking relationship with the drive shaft assembly.

DETAILED DESCRIPTION

FIGS. 1 and 2 illustrate therein an improved handpiece assembly 10 constructed according to the present invention. The handpiece assembly 10 includes a tubular housing assembly 11 which has a drive shaft assembly 12 rotatably supported therein. The rearward end of the housing assembly 11 is fixedly connected to a motor adaptor 13, and a conventional washer 14 is fixedly positioned between the housing assembly 11 and the motor adaptor 13 for properly fixedly positioning same.

The housing assembly 11 includes an elongated sleeve-like bearing housing 16 which has a pilot housing 17 fixedly secured to the forward end thereof, as by being press-fitted thereon. The pilot housing 17 has a guide opening 18 formed in the forward end thereof which is adapted to receive therein the shank of a conventional tool. The other end of the bearing housing 16 is provided with an enlarged portion 19 which is adapted to be fixedly connected to the motor adaptor 13.

The motor adaptor 13 comprises an elongated sleeve-like member 21 which has an inwardly projecting angular shoulder 22 formed therein at a location substantially midway between the ends thereof. The forward end of the member 21 is adapted to receive therein the enlarged portion 19 of the bearing housing 16, which enlarged portion 19 is fixedly connected to the member 21 by any conventional means, such as by cooperating threads 23. The member 21 is also provided with an internal thread 24 formed in the rearward portion thereof for permitting the motor adaptor 13 to be fixedly secured to a conventional power source. Reference is hereby made to copending application Ser. No. 84,071, filed Oct. 26, 1971, and owned by the same assignee as this application. This copending application discloses therein a motor structure suitable for connection to the handpiece assembly 10 of the present invention.

The drive shaft assembly 12 is rotatably supported within the housing assembly 11 and, for this purpose, the handpiece assembly 10 is provided with a pair of spaced, ball or roller anti-friction bearings 26 and 27. The bearings are disposed between the drive shaft assembly 12 and the bearing housing 16 for rotatably supporting the drive shaft assembly relative to the surrounding housing.

Considering now the structural details of the drive shaft assembly 12, same includes an input shaft 31 disposed in the rearward end of the bearing housing 16 and having a reduced diameter portion 32 projecting from the rearward end thereof, which portion 32 has a conventional shaft coupler 33 nonrotatably secured thereto, as by being press-fitted thereon. The shaft coupler 33 is of conventional structure and is designed for enabling the handpiece assembly 10 to be rotatably connected to a suitable power source, such as in the manner disclosed in copending application Ser. No. 84,071. The forward end of the input shaft 31 also has a reduced diameter portion 34 projecting therefrom, which portion 34 is fixedly secured, as by means of a press-fit, to a coaxially aligned drive shaft 36. The drive shaft 36 comprises a sleeve-like member having an opening or bore 37 formed in the rearward end thereof.

The drive shaft assembly 12 also has a movable coupling means 40 associated therewith for permitting the drive shaft assembly 12 to be releasably drivingly connected to the shank of a suitable tool. The movable coupling means 40 includes a cylindrical locking member or plug 38 slidably disposed within the bore 37. A spring pin 39 is fixedly secured to the plug 38 and extends radially outwardly from opposite sides thereof. The end portions of the pin 39 extend through axially elongated slots 41 formed in the drive shaft 36, and the outer ends of the pin 39 are confined within openings formed in a holding sleeve 42 which surrounds and is slidably supported on the drive shaft 36. The drive shaft 36, the cylindrical plug 38 and the holding sleeve 42 are thus nonrotatably interconnected by the pin 39, whereas the slots 41 enable the plug 38 and sleeve 42 to be slidably displaced as a unit axially of the drive shaft 36.

The holding sleeve 42, in the illustrated embodiment, is also provided with a pair of diametrically opposite teeth 43 projecting radially outwardly adjacent the rearward end of the sleeve for a purpose to be explained hereinafter. Further, the cylindrical plug 38 and the holding sleeve 42 are normally resiliently urged toward the front end (leftward end in FIG. 2) of the handpiece assembly 10 by means of a compression spring 44 confined within the bore 37. The spring 44 normally urges the cylindrical plug forwardly into a position wherein it is disposed for locking engagement with the shank of a selected tool.

To permit the drive shaft assembly 12 to be disposed in driving engagement with the shank of a tool, the forward axial end of the cylindrical plug 38 has a recess 46 formed thereacross, which results in a projection 47 extending axially of the plug 38. The projection 47 has a substantially planar flat 48 formed thereon and disposed within a substantially axially extending plane. The projection 47, as defined by the flat 48, has a cross section which approximates or is slightly less than half of a cylinder.

The forward end of the projection 47 is normally resiliently urged, as by the spring 44, into abutting engagement with a key 49 which is fixedly secured to the drive shaft 36. The key 49 is fixedly positioned within a slot 51 formed in the wall of the drive shaft 36. Further, a retaining sleeve 52 is preferably disposed in surrounding relationship to the key and the drive shaft, as by being press-fit on the drive shaft 36. The key 49 preferably has a cross-sectional profile (FIG. 3) which is substantially equal to or slightly less than half of a cylinder.

The forward end of the drive shaft 36 has a further bore 53 formed therein which is substantially coaxially aligned with but is of slightly smaller diameter than the bore 37. The bore 53 is adapted to freely rotatably receive therein the cylindrical shank 54 of a conventional tool or burr 56, specifically a dental drill or the like.

To permit the tool 56 to be drivingly connected to the drive shaft assembly 12, the rearward end of the shank 54 is provided with a first recess 57 extending substantially diametrically thereacross. The recess 57 extends inwardly from the free end of the shank and defines on the tool a substantially diametrically extending flat 58. The shank 54 has still a further recess 59 extending diametrically thereacross, which recess 59 is substantially transverse to the recess 57 and is of limited axial width, being of a width slightly greater than the width of the key 49. The recess 59 is spaced axially inwardly from the free end of the shank 54 and results in the formation of a further substantially diametrically extending flat 61, which flat 61 is substantially perpendicular to the flat 58. The flat 61 extends about 2/3 of the diameter of the shank and it is connected to the flat 58 by a chamfer 62 which permits rotation of the shank 54 through an arc of 90° relative to the key 49.

The recesses 57 and 59 result in the formation of a cross section which, as viewed in FIG. 3, has an arcuate surface configuration extending through an angle slightly in excess of 90°. The locking portion 63, which is defined by the flat 58 and the outer peripheral surface of the shank, has a cross-sectional profile (FIG. 4) which is substantially equal to or slightly greater than half of a cylinder. The locking portion 63 and the projection 47, when axially overlapped, thus substantially comprise a cylinder to provide a rotatable locking relationship between the plug 38 and the tool 56. The flat 61 is closely adjacent the flat 60 on the key 49 for driving the shank 54.

The handpiece assembly 10 is also provided with actuating means 66 for permitting a tool to be inserted into or removed from the assembly, which actuating means 66 includes an actuating ring 67 surrounding and slidably supported on the bearing housing 16 adjacent the rearward end thereof. The actuating ring 67 is fixedly interconnected by means of radial pins 68 to an actuating sleeve 69 which is slidably supported within the bearing housing 16. The actuating sleeve 69 is positioned in surrounding relationship to the holding sleeve 42 but is slightly spaced therefrom so as to not interfere with the free rotation of the sleeve 42. The ring 67 and sleeve 69 are maintained in a non-rotatable position relative to the bearing housing 16 by means of the pins 68 which extend through axially elongated slots 71 formed in the bearing housing 16. The actuating means 66 is normally maintained in an inoperative position (as illustrated in FIG. 2) by means of a compression spring 73 which is disposed in surrounding relationship to the housing 16. The spring 73 normally resiliently urges the actuating means 66 into a forwardmost inoperative position wherein the pins 68 abut the forward ends of the slots 71. The rearward end of the actuating sleeve 69 is also preferably provided with a plurality of circumferentially spaced slots 72 extending radially through the wall thereof, which slots are adapted to receive therein the teeth 43 when the actuating sleeve 69 is retracted rearwardly relative to the holding sleeve 42. In the illustrated embodiment, the actuating sleeve 69 may be provided with four equally spaced slots formed in the rearward end thereof.

OPERATION

Assuming that the handpiece assembly 10 has a tool 56 mounted thereon substantially as illustrated by dotted lines in FIG. 2, and assuming further that a suitable power source (not shown) is interconnected to the shaft coupler 33, then the assembly 10 is in condition to permit utilization of same. When the power source is activated, the shaft coupler 33, the input shaft 31 and the drive shaft 36 are thus rotated, which also causes a corresponding rotation of the spring pin 39 so that the holding sleeve 42 and cylinder plug 38 are likewise rotated. Since the projection 47 of the cylinder plug 38 is disposed in axially overlappng engagement with the locking portion 63 of the tool 56, rotation of the tool 56 relative to the drive shaft 36 is positively prevented so that rotation of plug 38 also causes a corresponding rotation of tool 56. The locking portion 63 of the tool 56 also radially overlaps the key 49 so that the tool 56 is thus axially retained and coupled to the drive shaft assembly 12 and can not be accidentally disconnected or axially separated therefrom. The clearance between the flats 47 and 58 is substantially greater than the clearance between the flats 60 and 61. Thus, the rotation of the shank 54 by the shaft 36 is effected by the engagement between the flats 60 and 61.

When it is desired to remove the tool 56 from the handpiece assembly 10, then the user manually grips the actuating ring 67 and pulls same rearwardly (rightwardly in FIG. 2) until the rearward end of the actuating sleeve 69 abuts the teeth 43. If the teeth 43 and slots 72 do not initially align, then a slight manual rotation of the tool 56 relative to the housing results in the teeth 43 and slots 72 aligning with one another, whereupon the teeth 43 enter the slots 72 so as to hold and nonrotatably connect the drive shaft assembly 12 to the surrounding bearing housing 16. Further axial retraction of the actuating means 66 (rightwardly in FIG. 2) then causes a corresponding axial retraction of the holding sleeve 42, which carries with it the spring pin 39 and the cylinder plug 38. In this manner, the cylinder plug 38 is retracted axially (rightwardly in FIG. 2) until the projection 47 no longer axially overlaps the locking portion 63 of the tool 56. With the cylinder plug 38 manually retained in this retracted position, the other hand of the user then manually rotates the tool 56 relative to the drive shaft assembly 12, the latter being held against rotation relative to the housing due to the engagement of the teeth 43 in the slots 72. The tool 56 is manually rotated through an angle of approximately 90°, which rotation is permitted due to the right angle relationship of, and the chamfered edge between, the flats 58 and 61. This 90° rotation of the tool 56 results in the locking portion 63 being disposed so that it no longer radially overlaps the key 49, whereupon the locking portion 63 is then axially moved past the key 49 to permit the tool 56 to be axially withdrawn from the handpiece assembly 10.

When it is desired to insert a new tool in the handpiece assembly 10, then same is inserted into the handpiece assembly and nonrotatably and drivingly connected to the drive shaft assembly 12 in a manner which is substantially the reverse of the removal process described above.

While the invention, as described above, provides a positive lock or brake (namely the teeth 43 and the slots 72) for fixedly securing the drive shaft assembly 12 to the surrounding housing 11 during the attachment or removal of a tool to or from the handpiece assembly, nevertheless the positive lock or brake could be replaced by a friction-type brake. For example, the slots 72 could be eliminated so that the rearward end of the actuating sleeve 69 would be continuous, which rearward end could then be moved into frictional engagement with either a fragmented or continuous annular flange formed on the holding sleeve 42, which annual flange would replace the teeth 43. In this manner, a frictional engagement could be provided between the holding sleeve 42 and the actuating sleeve 69, which frictional engagement would be sufficient to function as a brake so as to hold the drive shaft assembly 12 stationary relative to the housing during a tool changing operation.

Although a particular preferred embodiment of the invention has been disclosed in detail for illustrative purposes, it will be recognized that variations or modifications of the disclosed apparatus, including the rearrangement of parts, lie within the scope of th present invention.

The embodiments of the invention in which an exclusive property or privelege is claimed are defined as follows:

1. A handpiece assembly for a rotatable tool having a shank comprising:
   elongated tubular housing means adapted to rotatably support the shank therein;
   drive shaft means rotatably supported in said housing means and extending longitudinally thereof for engagement with and driving of said shank, one end of said drive shaft means being adapted for driving connection to a power source;
   said drive shaft means including an elongated tubular drive shaft having one end thereof terminating adjacent the front end of said housing means, said one end of said tubular drive shaft being adapted to have the shank of said tool slidably inserted therein;
   releasable coupling means disposed within said housing means and associated with said drive shaft means for locking said drive shaft means to said shank;
   said releasable coupling means including a locking member coaxial with and slidably supported within said drive shaft and means nonrotatably connecting said locking member to said drive shaft, said locking member being axially slidable relative to said drive shaft means between a tool locking position and a tool release position, said locking member and said shank having cooperating surfaces for effecting a relatively nonrotatable connection therebetween when said locking member is in said locking position;
   said coupling means further including a sleeve-like member fixedly connected to said locking member and positioned externally of and slidably supported on said drive shaft means, said sleeve-like member being disposed internally of said tubular housing means and
   actuating means for effecting movement of said locking member into said release position for permitting a tool to be removed from or mounted in said handpiece assembly, said actuating means including an actuating member positioned externally of said housing means and supported for movement relative thereto, and said actuating means being releasably engageable with said sleeve-like member for effecting movement thereof axially of said tubular drive shaft for causing movement of said locking member from said locking position to said release position.

2. A handpiece assembly according to claim 1, wherein said actuating member is nonrotatably interconnected to said housing means but is axially slidably supported thereon for movement relative to said housing means between first and second positions;
   releasable brake means coacting between said sleeve-like member and said actuating means for enabling said releasable coupling means and said drive shaft means to be held nonrotatable relative to said housing means, said brake means being normally disengaged for permitting rotation of said drive shaft means when said actuating means is in said first position, said brake means being engaged for preventing rotation of said drive shaft when said actuating means is disposed in an intermediate position located between said first and second positions, and movement of said actuating means from said intermediate position toward said second position causing displacement of said sleeve-like member and said locking member toward said tool release position.

3. A handpiece assembly according to claim 2, wherein said actuating member comprises a ring positioned externally of said housing means in surrounding relationship thereto and constrained for axial sliding movement relative to said housing means between said first and second position;
   said brake means including a first brake portion fixedly interconnected to said actuating ring and disposed internally of said housing means, said brake means also including a second brake portion fixedly interconnected to said sleeve-like member, said first and second brake portions being normally axially spaced from one another and maintained in a disengaged position;
   first spring means coacting with said releasable coupling means for normally resiliently urging same toward said tool locking position; and
   second spring means coacting with said actuating means for normally resiliently urging same toward said first position.

4. A handpiece assembly according to claim 3, wherein said first brake portion comprises an actuating sleeve disposed internally of and slidably supported relative to said housing means and fixedly interconnected to said actuating ring, said actuating sleeve being disposed in surrounding relationship to said sleeve-like member and having brake means formed on a rearward axial end thereof, said sleeve-like member having outwardly extending radial projection means formed thereon and normally axially spaced from the rearward axial end of said actuating sleeve, whereby axial movement of said actuating ring from said first position to said intermediate position, causes the rearward axial end of said actuating sleeve to engage the radial projection means of said sleeve-like member for effecting braking thereof.

5. A handpiece assembly for a rotatable tool having a shank comprising:
   elongated tubular housing means adapted to rotatably support the shank therein;
   drive shaft means rotatably supported in said housing means and extending longitudinally thereof for engagement with and driving of said shank, one end of said drive shaft means being adapted for driving connection to a power source;
   releasable coupling means disposed within said housing means and associated with said drive shaft means for locking said drive shaft means to said shank;
   said releasable coupling means including a locking member coaxial with said drive shaft means and means nonrotatably connecting said locking member to said drive shaft means, said locking member being axially slidable relative to said drive shaft means between a tool locking position and a tool release position, said locking member and said shank having cooperating surfaces for effecting a relatively nonrotatable connection therebetween when said locking member is in said locking position;
   actuating means for effecting movement of said locking member into said release position for permitting a tool to be removed from or mounted in said handpiece assembly, said actuating means including an actuating member positioned externally of said housing means and supported for movement relative thereto;
   said actuating member comprising an actuating ring disposed externally of said housing means and positioned in surrounding but slidable relationship thereto, and means coacting between said actuating ring and said housing means for nonrotatably connecting said actuating ring to said housing means while enabling said actuating ring to be axially slidably displaced relative to said housing means between first and second positions; and
   disengagable brake means coacting between said actuating means and said releasable coupling means for permitting said coupling means and said drive shaft means to be maintained in a nonrotatable condition relative to said housing means;
   said brake means including first and second cooperating brake portions on said actuating means and said releasable coupling means. respectively, said first and second brake portions being normally spaced and disengaged from one another when said actuating means is in said first position and said locking member is in said tool locking position.

6. A handpiece assembly according to claim 5, further including first biasing means coacting with said actuating means for normally maintaining said actuating means and said actuating ring in said first position, and second biasing means coacting with said coupling means for normally maintaining said locking member in said tool locking position.

7. A handpiece assembly according to claim 6, wherein said first and second brake portions engage one another when said actuating means is moved into a third position disposed intermediate said first and second positions, whereby continued axial movement of said actuating means from said third position toward said second position causes said locking member to be axially moved from said locking position toward said release position.

8. A handpiece assembly according to claim 7, wherein said drive shaft means includes an elongated tubular drive shaft having one end thereof terminating adjacent the front end of said housing means, said one end of said tubular drive shaft being adapted to have the shank of said tool slidably inserted therein, and said locking member being slidably supported within said drive shaft member and nonrotatably connected thereto.

9. A handpiece assembly according to claim 5, further including first and second anti-friction bearing means coacting between said housing means and said drive shaft means for rotatably supporting said drive shaft means within said housing means, said first anti-friction bearing means being disposed adjacent the rearward end of said housing means, and said second anti-friction bearing means being axially spaced a substantial distance from said first anti-friction bearing means in a direction toward the front end of housing means but being axially inwardly spaced a substantial distance from the front end of said housing means; and said drive shaft means including a tubular drive shaft rotatably supported by said second anti-friction bearing means and having an axially elongated tubular portion extending forwardly beyond said first anti-friction bearing means in a cantilever manner for receiving therein the elongated shank of said tool.

10. A handpiece assembly for a rotatable tool having a shank adapted to the drivingly engaged with said handpiece assembly, said shank having a shoulder adjacent the free end thereof and first and second arcuate sectors projecting outwardly from said shoulder, said first arcuate sector being defined by a substantially diametrically extending plane which projects from the free end of said shank to said shoulder and defines a driven surface so that said first arcuate sector extends through an angle of approximately 180°, and said second arcuate sector being disposed axially between said first arcuate sector and said shoulder and being defined by said first plane and by a second plane which extends substantially transverse to said plane so that said second arcuate sector extends through an angle of approximately 90°, said arcuate sector resulting in the formation of a radially directed recess between said shoulder and said first arcuate sector, the improvement wherein said handpiece comprises:
   elongated tubular housing means adapted to rotatably support said tool therein;
   drive shaft means rotatably supported in said housing means and extending longitudinally thereof for engagement with said shank, one end of said drive shaft means being adapted for driving connection to a power source, the other end of said drive shaft means including a tubular drive shaft portion adapted to have the shank of said tool slidably inserted therein;
   key means fixed to said tubular drive shaft portion and projecting into the interior opening defined thereby for axially locking said shank to said drive shaft means, said key means projected into said opening and extending substantially diametrically thereacross to provide clearance space in said opening to enable said first arcuate sector to be axially slidably moved past said key means, said key means having a width at least slightly less than the width of said recess as defined by said second arcuate sector so as to enable said key means to project into said recess; and releasable coupling means associated with said drive shaft means for nonrotatably connecting said drive shaft means to said shank, said coupling means including a connecting member nonrotatably connected to said drive shaft means and axially slidably movable relative to said drive shaft means between a tool locking position and a tool release position, said connecting member including a projecting portion disposed within the opening defined interiorly of said tubular drive shaft portion and disposed rearwardly of said key means, said projecting portion projecting into said opening no more than approximately the diametrical plane thereof so as to fill approximately one half of said opening, said projecting portion having a driving surface defined by a substantially diametrical plane with said driving surface being adapted to be disposed directly opposite the driven surface on said first arcuate sector;

whereby said shank can be slidably inserted into the opening defined in the interior of said tubular shaft portion so that said first arcuate sector slidably moves axially past said key means while said connecting member is maintained in said tool release position, said inward axial movement of said shank continuing until said shoulder substantially abuts said key means, said shank then being rotated approximately 90° relative to said drive shaft means so that said key means projects into said recess for actually interlocking said shaft means to said drive shaft means, and said projecting portion of said connecting member then being moved axially into locking position so as to axially overlap said first arcuate sector for nonrotatably interconnecting said shank to said drive shaft means.

11. A handpiece assembly according to claim 10, wherein said connecting member is disposed within said tubular drive shaft portion and is axially slidably movable relative thereto.

12. A handpiece assembly for a rotatable tool including a shank having an outwardly facing stop surface thereon, comprising:

elongated tubular housing means adapted to rotatably support the shank therein;

drive shaft means rotatably supported in said housing means and extending longitudinally thereof for engagement with and driving of said shank, one end of said drive shaft means being adapted for driving connection to a power source;

stop means fixedly mounted on said drive shaft means and positioned for abutting engagement with the stop surface on said shank for limiting inward axial movement of said shank relative to said drive shaft means whereby external forces applied to said tool are transmitted through said shank directly to said stop means so as to be imposed on said drive shaft means;

releasable coupling means disposed within said housing means and associated with said drive shaft means for locking said drive shaft to said shank;

said releasable coupling means including a locking member coaxial with said drive shaft means and means nonrotatably connecting said locking member to said drive shaft means, said locking member being axially slidable relative to said drive shaft means between a tool locking position and a tool release position, said locking member and said shank having cooperating surfaces for effecting a relatively nonrotatable connection therebetween when said locking member is in said locking position;

biasing means coacting with said coupling means for normally maintaining said locking member in said tool locking position; and actuating means for effecting movement of said locking member into said release position for permitting a tool to be removed from or mounted in said handpiece assembly, said actuating means including an actuating member positioned externally of said housing member and supported for movement relative thereto.

13. A handpiece assembly according to claim 12, wherein said shank is formed with a recess extending transversely thereacross and bounded by a pair of opposed stop surfaces, and said stop means projecting into said recess for preventing axial movement of said shank relative to said drive shaft means in either axial direction.

* * * * *